United States Patent
Menon et al.

(10) Patent No.: US 10,321,331 B2
(45) Date of Patent: Jun. 11, 2019

(54) METHOD AND SYSTEM FOR CROSSED ANTENNA FEED DETECTION

(71) Applicant: Nokia Solutions and Networks OY, Espoo (FI)

(72) Inventors: Rekha Menon, Bothell, WA (US); Eamonn Gormley, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/560,999

(22) PCT Filed: Mar. 23, 2016

(86) PCT No.: PCT/US2016/023800
§ 371 (c)(1),
(2) Date: Sep. 22, 2017

(87) PCT Pub. No.: WO2016/154327
PCT Pub. Date: Sep. 29, 2016

(65) Prior Publication Data
US 2018/0115913 A1 Apr. 26, 2018

Related U.S. Application Data

(60) Provisional application No. 62/137,101, filed on Mar. 23, 2015.

(51) Int. Cl.
*H04W 24/02* (2009.01)
*H04W 16/28* (2009.01)
(Continued)

(52) U.S. Cl.
CPC ............ *H04W 16/28* (2013.01); *H01Q 1/246* (2013.01); *H04W 24/02* (2013.01); *H04W 36/0061* (2013.01); *H04W 36/0072* (2013.01)

(58) Field of Classification Search
CPC ..... H04W 24/08; H04W 24/00; H04W 24/02; H04M 15/41
See application file for complete search history.

(56) References Cited

U.S. PATENT DOCUMENTS 8,594,658 B2 * 11/2013 Guo ...................... H04W 24/08
455/101
2009/0135730 A1 * 5/2009 Scott ..................... H04W 24/02
370/252
(Continued)

FOREIGN PATENT DOCUMENTS

CN    101505489 A  *  8/2009  ............ H04W 24/00
CN    101964988 A     2/2011
(Continued)

OTHER PUBLICATIONS

Machine Translation of CN102075953 with Examiner labeled paragraphs, translated 2018 (Year: 2018).*
(Continued)

*Primary Examiner* — Matthew C Sams (57) ABSTRACT

A method for a cellular telecommunications network includes selecting first and second source cells that are co-sited cells associated with first and second antennas, respectively, identifying first neighbor cells of the first cell and second neighbor cells of the second cell, determining that an antenna feed for the second cell is feeding the first antenna by comparing locations of the first neighbor cells to a pointing direction of the first antenna.

19 Claims, 6 Drawing Sheets

(51) Int. Cl.
*H01Q 1/24* (2006.01)
*H04W 36/00* (2009.01)

(56) References Cited

U.S. PATENT DOCUMENTS

| | | | | |
|---|---|---|---|---|
| 2011/0009135 A1* | 1/2011 | Roskowski | ....... | H04W 36/0083 455/500 |
| 2012/0002563 A1* | 1/2012 | Flanagan | ............ | H04W 24/08 370/252 |
| 2013/0115939 A1* | 5/2013 | Guo | .................. | H04W 24/08 455/423 |
| 2013/0122855 A1* | 5/2013 | Kenington | ............ | H04W 24/08 455/405 |
| 2013/0324110 A1* | 12/2013 | Kenington | ............ | H04W 24/08 455/423 |
| 2016/0135067 A1* | 5/2016 | Morad | ................. | H04M 15/41 455/423 |

FOREIGN PATENT DOCUMENTS

| | | | |
|---|---|---|---|
| CN | 102026236 | | 4/2011 |
| CN | 102026236 A | * | 4/2011 |
| CN | 102075953 | | 5/2011 |
| CN | 102075953 A | * | 5/2011 |
| CN | 102075953 A | | 5/2011 |
| CN | 102355690 A | * | 2/2012 |
| CN | 102440023 | | 5/2012 |
| WO | WO2007058606 | | 5/2007 |
| WO | WO 2010/069201 A1 | | 6/2010 |

OTHER PUBLICATIONS

Machine Translation of CN102075953 with Chinese Publication showing Figures, translated 2018 (Year: 2018).*
Office Action dated Feb. 9, 2018 for Korean Application No. 10-2017-7030541.
International Search Report for PCT/US2016/023800 filed on Mar. 23, 2016.
Office Action dated Oct. 15, 2018 for Japanese Application 2017-549615.
Search Report dated Nov. 28, 2018 for European Application No. 16769618.6.

* cited by examiner

METHOD AND SYSTEM FOR CROSSED ANTENNA FEED DETECTION

CROSS-REFERENCES TO RELATED APPLICATIONS

The present disclosure is a U.S. National Stage of Application No. PCT/US2016/023800 filed Mar. 23, 2016, which claims priority to U.S. Provisional Application No. 62/137,101 filed on Mar. 23, 2015, which are incorporated by reference herein.

BACKGROUND

Wireless telecommunications networks are constantly evolving. As wireless telecommunications technologies proliferate, new base stations are installed to provide service to an ever increasing number of users that use an increasing amount of data. In addition, existing base stations are serviced to maintain and upgrade the existing sites.

The installation and maintenance of base stations is performed by trained and skilled personnel. However, cellular equipment is highly complex, and is not typically designed for ease of installation. Errors are made when installing and maintaining base station equipment that result in compromised performance.

While some technician errors are easy to detect and resolve, other errors are more difficult to detect. One error that occurs in networks is a crossed, or incorrect antenna feed at a cell-site.

In a cellular network, each cell-site may house multiple cells belonging to different frequencies and technologies. For a specific frequency and technology, a site could also have multiple cells. These may correspond to different sectors and may be intended to provide coverage along different directions using antennas pointed in these different directions.

Each cell-site has one or more antennas. The antennas may point in different directions. These antennas may also be used for transmit and/or receive purposes.

Each cell has one or more antenna feeders. Antenna-feeders from cells need to be connected to the correct antenna at the cell-site. The term correct antenna refers to an antenna pointing in the direction intended for the cell and/or intended purpose of the antenna feeder, which may be to transmit or receive. The installation is further complicated by the fact that may be multiple cells per antenna (belonging to different frequencies or technologies). Feeders from multiple cells may be combined into one physical cable which feeds the antenna by using an RF combiner.

Crossed feeders could happen in multiple ways including between sectors or between transmit and receive antennas at sectors. The crossed feeders can also occur at multiple locations in the set-up, including before or after the RF combiner.

When a crossed antenna feed is present, instructions for a target antenna are incorrectly delivered to a crossed antenna. As a result, some of the actual configuration parameters of cells (e.g. antenna pointing direction and antenna elevation) at these sites will be different from the planned configuration of the cells. This may lead to unexpected behavior of network performance management operations such as capacity and coverage optimization, cell outage compensation etc., which rely on accurate cell configuration information.

In most scenarios, the manifestation of a crossed-antenna on network performance is such that it is not easy to directly deduce the root-cause of the issue as being a crossed-antenna feeder. For example, a crossed-antenna issue at a cell-site could result in poor scrambling-code disambiguation. However, it is not easy to map this issue to a crossed-antenna feeder at a particular site. Furthermore, in the case of new base stations, there is no control data, so it is difficult to differentiate a potential crossed antenna feed from other variables that can affect performance.

Network operators are aware of the potential issues related to a crossed antenna feed. Conventionally, drive tests are conducted to compare antenna configuration data to actual measured data. In a drive test, a technician will drive to specific geographic areas measure cell characteristics. However, drive tests are expensive, time consuming, and error prone. Networks would benefit from a system and method that reliably detects crossed antenna feeds, as well as a system and method that automates at least some portion of crossed antenna feed detection.

BRIEF SUMMARY

Embodiments of the present disclosure are directed to detecting the presence of a crossed antenna feed. In particular, at least of direction information and handover information may be used to identify a crossed antenna feed.

In an embodiment, a method for a cellular telecommunications network includes selecting first and second source cells that are co-sited cells associated with first and second antennas, respectively, identifying first neighbor cells of the first cell and second neighbor cells of the second cell, determining that an antenna feed for the second cell is feeding the first antenna by comparing locations of the first neighbor cells to a pointing direction of the first antenna. The method may further include disconnecting the antenna feed for the second antenna from the first antenna, and connecting the antenna feed for the second antenna to the second antenna.

In an embodiment, the pointing direction of the first antenna is a zone defined by an azimuth value of the first antenna stored by the network, and comparing locations of the first neighbor cells to the pointing direction of the first antenna includes determining a portion of the first neighbor cells that are in the zone. The zone may be bounded by a predetermined angle from the azimuth value of the first antenna.

In an embodiment, comparing locations of the first neighbor cells to a pointing direction of the first antenna includes determining whether a predetermined portion of neighbor cells of a neighbor cell list of the first cell are behind first antenna.

The method may further comprise calculating a first crossed antenna feed score for the first cell based on the locations of the first neighbor cells, wherein the first crossed antenna feed score is used to determine that the antenna feed for the second cell is feeding the first antenna. Calculating the first crossed antenna feed score for the first cell may include determining handover data for handovers from the first cell to the first neighbor cells. The first neighbor cells may be cells on a neighbor cell list (NCL) of the first cell, and the first crossed antenna feed score may be calculated by analyzing relationships between the first cell and each of the first neighbor cells.

In an embodiment, the method includes calculating a second crossed antenna feed score for the second cell by analyzing relationships between the second cell and each of the first neighbor cells. The method may further include comparing the first crossed antenna feed score to the second crossed antenna feed score to determine that the antenna feed for the second cell is feeding the first antenna.

In an embodiment, determining that the antenna feed for the second cell is feeding the first antenna includes determining that a majority of the first neighbor cells that receive handovers from the first cell are not within the pointing direction of the first antenna.

DETAILED DESCRIPTION

This document presents a system and method that can identify sites and associated cells where the antenna feeders may potentially be incorrectly assigned. This disclosure uses the term "crossed" to refer to incorrect antenna feed assignments. As used herein, the term "crossed" refers to an antenna feed that feeds an incorrect antenna. This applies to situations in which two feeds are reversed, e.g. a first antenna feed for a first antenna is attached to a second antenna, while an antenna feed for the second antenna is attached to the first antenna. The term "crossed" also refers to a situation where three or more antenna feeds of a single base station are incorrectly assigned. The term "swap" may also be used to describe these scenarios.

Embodiments of this disclosure may be applied to a number of cellular technologies, including, but not limited to, GSM (2G), UMTS (3G), LTE (4G), LTE Advanced, CDMA, WiMAX, etc. In addition, embodiments of this disclosure can be applied to systems and equipment from different network vendors, such as Ericsson, Nokia, Huawei etc.

Embodiments of the present disclosure retrieve configuration management information such as locations, antenna azimuth value, neighbor list, location and azimuth information of cells on the neighbor list and network operation data such as handover statistics for selected cells.

In a first phase of an embodiment, the most utilized neighbors of a cell are identified based on the handover statistics. A majority of the most utilized neighbors of a cell are generally expected to be located in the antenna pointing direction of the cell (or towards the direction of its planned coverage area). A list of cells that don't satisfy these criteria is created. These cells may or may not have crossed antenna cables. Configuration parameters can be used to adjust the suspect cells identification criterion and the resulting number of suspect-cells in the first phase.

In a second phase of an embodiment, sites at which suspect-cells are located are examined for additional evidence of crossed antenna cables. If a site has only one suspect-cell technology layer, then that site may be determined to not have crossed antenna feeders. Sites with more than one suspect-cell for a technology layer may be investigated in more detail. Various embodiments may identify inter-frequency crossed cells or intra-frequency crossed cells.

Location information, antenna pointing directions and handover statistics are used to calculate a cross-antenna score for the suspect-cells at the site. The cross-antenna score is then recalculated after virtually crossing the pointing direction of the suspect-cells. An improvement in score after the cross is evidence of a potential crossed antenna issue at the site. The potential crossed antenna sites along with confidence levels in the decisions may be recorded and reported to an operator.

Embodiments of this disclosure identify sites that have a potential crossed antenna feeder issue. The cells whose antennas have been crossed at these sites are also identified. Since identification of crossed antenna situations may not always be exact, the algorithm may additionally provide a score that indicates the confidence level of the determination of a crossed antenna feeder scenario.

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
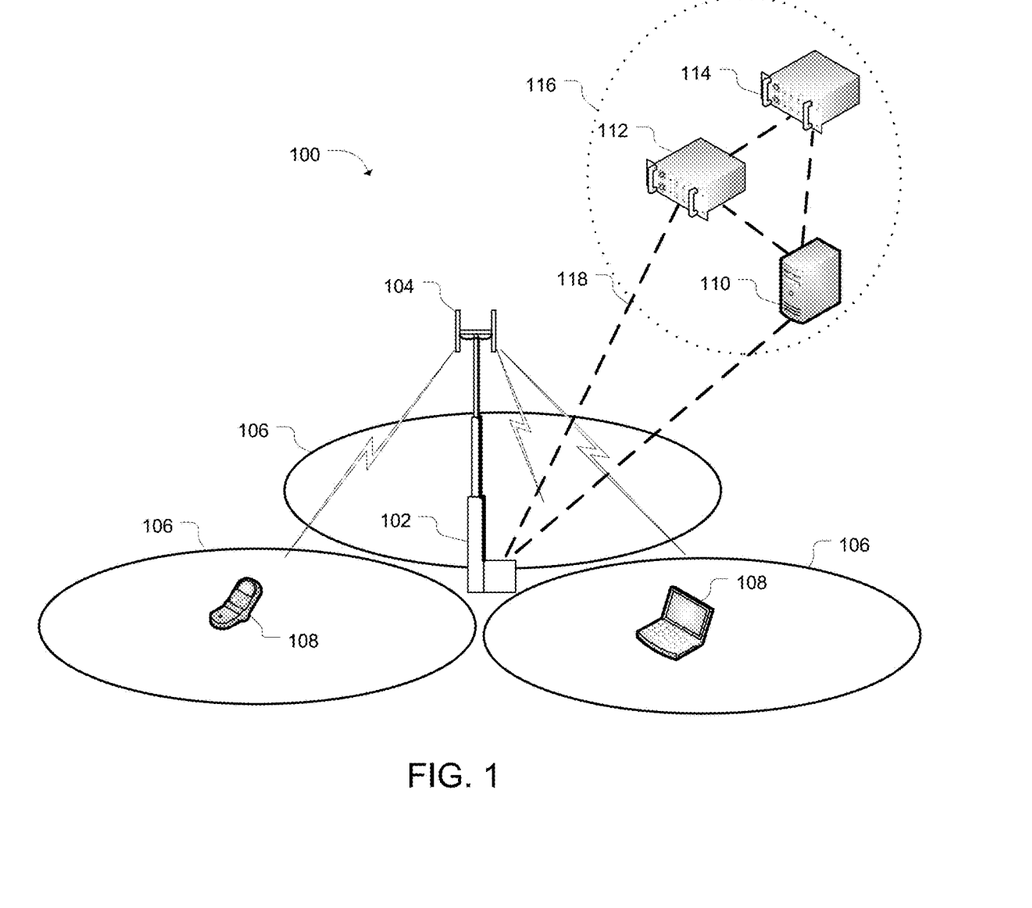
FIG. 1 illustrates a wireless communications system according to an embodiment.

FIG. 1 illustrates a networked communications system 100 according to an embodiment of this disclosure. System 100 may include one or more base stations 102, each of which are equipped with one or more antennas 104. Each of the antennas 104 may provide wireless communication for user equipment 108 in one or more cells 106. As used herein, the term "base station" refers to a wireless communications station provided in a location and serves as a hub of a wireless network. For example, in LTE, a base station may be an eNodeB. The base stations may provide service for macrocells, microcells, picocells, or femtocells. In this disclosure, the term "cell site" may be used to refer to the location of a base station.

The one or more UE 108 may include cell phone devices, laptop computers, handheld gaming units, electronic book devices and tablet PCs, and any other type of common portable wireless computing device that may be provided with wireless communications service by a base station 102. In an embodiment, any of the UE 108 may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

The system 100 may include a backhaul portion 116 that can facilitate distributed network communications between backhaul equipment 110, 112 and 114 and the one or more base station 102. As would be understood by those skilled in the Art, in most digital communications networks, the backhaul portion of the network may include intermediate links 118 between a backbone of the network which are generally wire line, and sub networks or base stations located at the periphery of the network. For example, cellular user equipment (e.g., UE 108) communicating with one or more base station 102 may constitute a local sub network. The network connection between any of the base stations 102 and the rest of the world may initiate with a link to the backhaul portion of a provider's communications network (e.g., via a point of presence).

In an embodiment, the backhaul portion 102 of the system 100 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base station 102) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Any of the network controller devices 110, 112 and 114 may be a dedicated Network Resource Controller (NRC) that is provided remotely from the base stations or provided at the base station. Any of the network controller devices 110, 112 and 114 may be a non-dedicated device that provides NRC functionality among others. In another embodiment, an NRC is a Self-Organizing Network (SON) server. In an embodiment, any of the network controller devices 110, 112 and 114 and/or one or more base stations 102 may function independently or collaboratively to implement processes associated with various embodiments of the present disclosure.

In accordance with a standard GSM network, any of the network controller devices 110, 112 and 114 (which may be NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110, 112 and 114 (optionally having NRC functionality) may be associated with a NRC, a serving GPRS support node (SGSN), or any other common network controller device known in the art, such as an RRM. In accordance with a standard LTE network, any of the network controller devices 110, 112 and 114 (optionally having NRC functionality) may be associated with an eNodeB base station, a mobility management entity (MME), or any other common network controller device known in the art, such as an RRM.

In an embodiment, any of the network controller devices 110, 112 and 114, the base stations 102, as well as any of the UE 108 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110, 112 and 114 or any of the base stations 102 may employ any number of common server, desktop, laptop, and personal computing devices.

Figure 2:
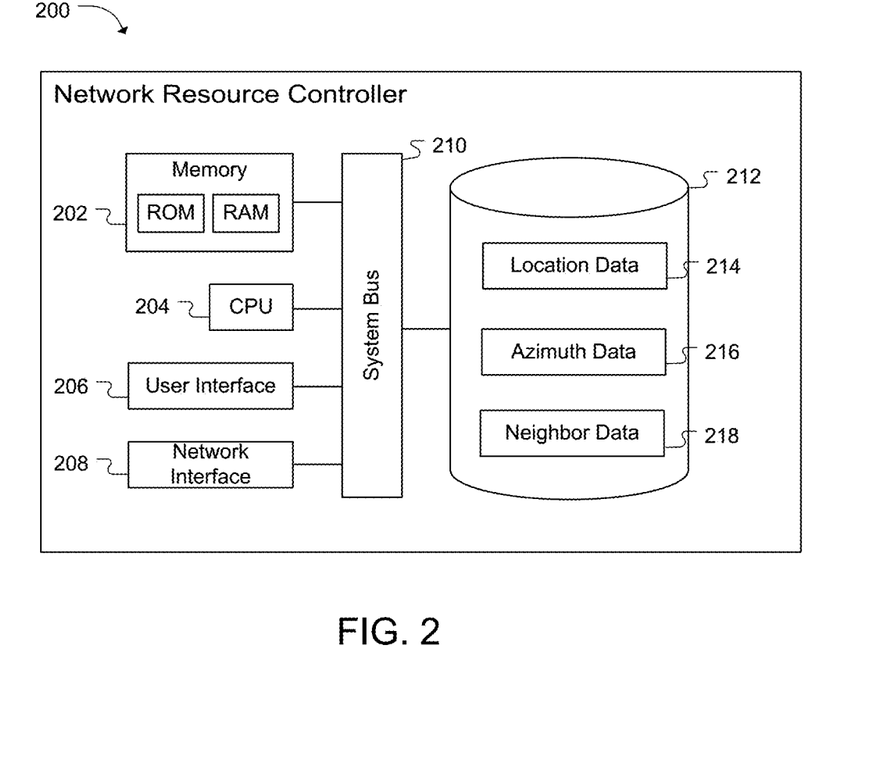
FIG. 2 illustrates a network resource controller according to an embodiment.

FIG. 2 illustrates a block diagram of an NRC 200 that may be representative of any of the network controller devices 110, 112 and 114. Accordingly, NRC 200 may be representative of a Network Management Server (NMS), an Element Management Server (EMS), a Mobility Management Entity (MME), a Performance Management (PM) server, or a SON server. The NRC 200 has one or more processor devices including a CPU 204.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may store, for example, azimuth data 214, cell points 216, and neighbor data 218.

The NRC 200 may also include a user interface 206 that allows an administrator to interact with the NRC's software and hardware resources and to display the performance and operation of the system 100. In addition, the NRC 200 may include a network interface 206 for communicating with other components in the networked computer system, and a system bus 210 that facilitates data communications between the hardware resources of the NRC 200.

In addition to the network controller devices 110, 112 and 114, the NRC 200 may be used to implement other types of computer devices, such as an antenna controller, an RF planning engine, a core network element, a database system, or the like. Based on the functionality provided by an NRC, the storage device of such a computer serves as a repository for software and database thereto.

Figure 3:
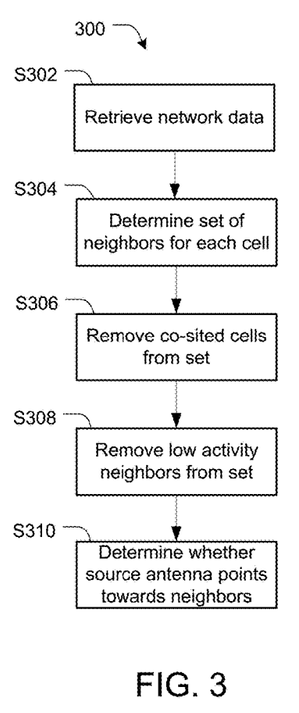
FIG. 3 illustrates an embodiment of a process for identifying candidates for a crossed antenna feed.

FIG. 3 illustrates a process 300 for identifying one or more crossed antenna candidate cell. Process 300, as well as other aspects of this disclosure, may be performed for one or more cell in a wireless network. In an embodiment, process 300 is performed for every antenna or cell in a cellular region or market. A single antenna may serve multiple cells that use different frequencies and technologies, any portion of which may be analyzed by process 300.

In another embodiment, process 300 is selectively performed for one or more set of antennas in a region. Process 300 may be performed by a computer entity coupled to a backhaul portion of a network, such as a network resource controller 200. The particular antenna and cell that are being analyzed are referred to as the source cell and the source antenna.

Network data is retrieved at S302. Network data may be retrieved from one or more network entity, such as a base station, an MME, or a PM server. The following data is a non-exclusive list of data that may be retrieved at S302: Location information such as latitude and longitude coordinates of cells, cellular identifiers, antenna azimuth angles, frequency and technology layers for cells, intra-frequency neighbor cell lists for each cell, base station identifiers and the identities of cells which are served by each base station, handover data including handover metrics such as numbers of handover successes, handover attempts and failures in a given time, user-interface parameters, configuration parameters, etc.

Figure 4:
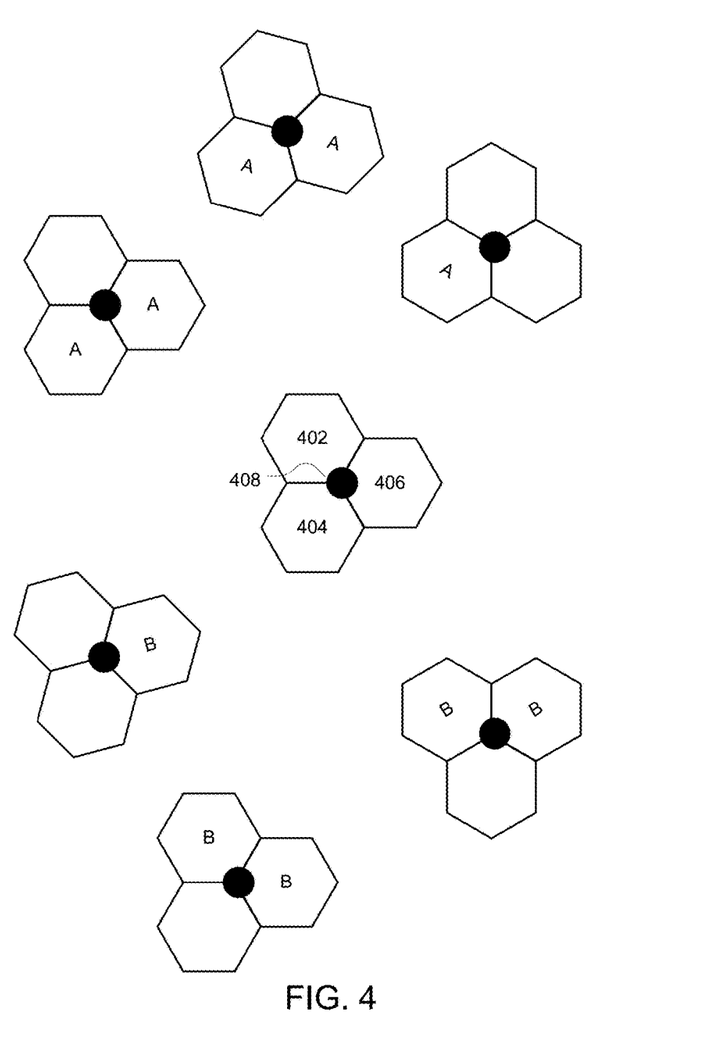
FIG. 4 illustrates source cells and neighbor cells in a geographic region.

FIG. 4 shows an embodiment of a network sector that includes a plurality of base stations, each of which serves three cells. In FIG. 4, base station 408 serves three different cells 402, 404 and 406 in the same frequency range. FIG. 4 shows the cells as three different hexagons around a single circle which represents a base station. However, the hexagons of FIG. 4 are not accurate representations of cell coverage areas—rather, they are provided to show general pointing directions of the antennas that serve the cells.

In FIG. 4, the surrounding intra-frequency neighbor cells labeled "A" highly-likely to be mobility neighbors of cell 402, while the cells labeled "B" highly-likely to be mobility neighbors of cell 404. In other words, a majority of handovers from cell 402 would be expected to occur to the "A" cells, while a majority of handovers from cell 404 would be expected to occur to the cells labeled "B." The likelihood of such handovers occurring decreases with distance from the source base station 408.

The handover targets to and from a cell being in the opposite direction from the pointing direction of the cell is an indicator of possible crossed antenna feeds. Moreover, when a majority of handovers targets for two intra-frequency co-sited cells are on opposite sides from the pointing directions of the cells, a crossed antenna feed is likely present at the base station. Therefore, elements of process 300 analyze neighbor lists, handover data, and pointing directions of cells to identify crossed antenna feed candidates.

If a source cell has a low number of neighbor cells, then there may not be sufficient data points to make a reliable determination of whether neighbor cells are in a pointing direction of the source antenna with a high degree of confidence. The reliability of detecting a candidate source cell is proportional to the number of neighbor cells that are analyzed for a source cell.

Therefore, in an embodiment, process 300, and in particular S304, may include comparing the number of cells on the neighbor cell list of the source cell to a predetermined value, and if the number of neighbor cells is less than the predetermined value, determining that the cell is not a candidate for crossed antenna feed detection. An example of a threshold value that may be used is five, so that a source cell must have at least five cells on its neighbor cell list in order to be identified as a candidate for a crossed antenna feed.

Neighbor cells of the source cell are determined, or identified, at S304. A neighbor cell list (NCL) of the source cell that is used by automatic neighbor relation (ANR) processes may be retrieved, and the neighbor cells on the neighbor list may be the set of neighbors that are determined at S304. In an embodiment, only the intra-frequency neighbor list is used. Not every neighbor cell on the neighbor cell list of the source cell is relevant to identifying a crossed antenna feed. Accordingly, the neighbor cell list of the source cell may be pruned to determine the set of neighbors at S304.

For example, co-sited neighbor cells typically appear on a source cell's neighbor list, but their positions relative to the source cell do not indicate whether a crossed antenna feed is present. In addition, co-sited neighbor cells are not typically in the planned coverage area of the source cell, so their presence would dilute the subsequent location analysis. Therefore, co-sited cells can be safely removed from the set of neighbors at S306 without compromising the efficacy of process 300.

The relevance of a neighbor cell to the identification depends, to some extent, on the degree of activity between the source cell and the neighbor cell. Larger numbers of handovers with a neighbor cell indicate that the neighbor cell is a reliable indicator of the actual pointing direction of the source cell.

Therefore, low activity neighbors may be removed from the set of neighbor cells at S308. Low activity neighbors may be neighbors whose handover activities with the source cell are less than a predetermined threshold value. For example, in an embodiment, the number of handovers from the source cell to a particular neighbor cell may be compared to a minimum level of handover activity, such as 10 or 100 handovers in the previous day, and if the number of handovers is less than the threshold value, the neighbor cell is removed from the set. The precise threshold value used at S308 may be higher in high activity network areas such as metropolitan centers and lower in lower activity areas such as rural zones.

After a set of neighbors has been identified for a source cell, process 300 determines whether the source cell antenna points towards the neighbors at S310. An embodiment of determining whether the source cell points towards the set of neighbors is illustrated as process 500 in FIG. 5.

Figure 6:
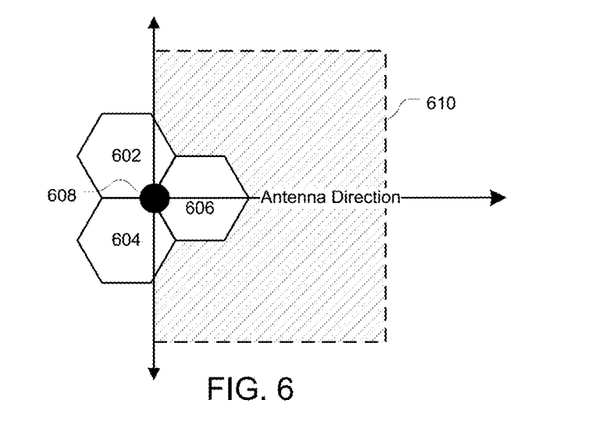
FIG. 6 illustrates an antenna pointing direction.

FIG. 6 shows an example of a source cell 606 of a base station 608 that is served by an antenna with a particular antenna direction. In an embodiment, a neighbor cell is within the pointing direction of a source antenna if the neighbor cell is forwards of a plane that is normal to the pointing direction of the antenna. This is illustrated by zone 610 in FIG. 6.

Returning to FIG. 5, the antenna direction, or azimuth, of the source antenna is determined at S502. The antenna direction may have been retrieved at S302.

Figure 5:
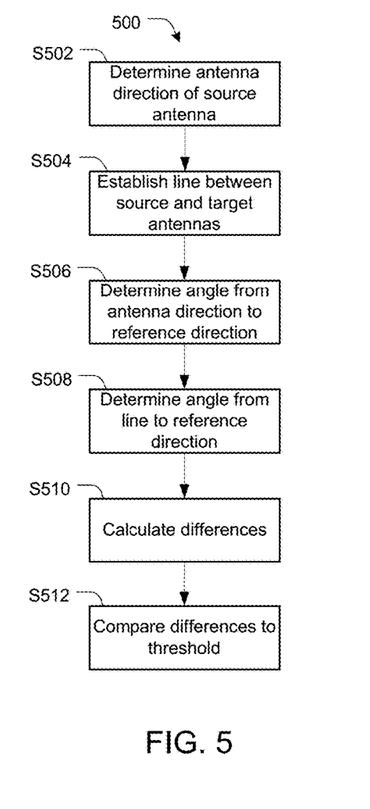
FIG. 5 illustrates an embodiment of a process for determining whether a source cell points towards a set of neighbors.
Figure 7:
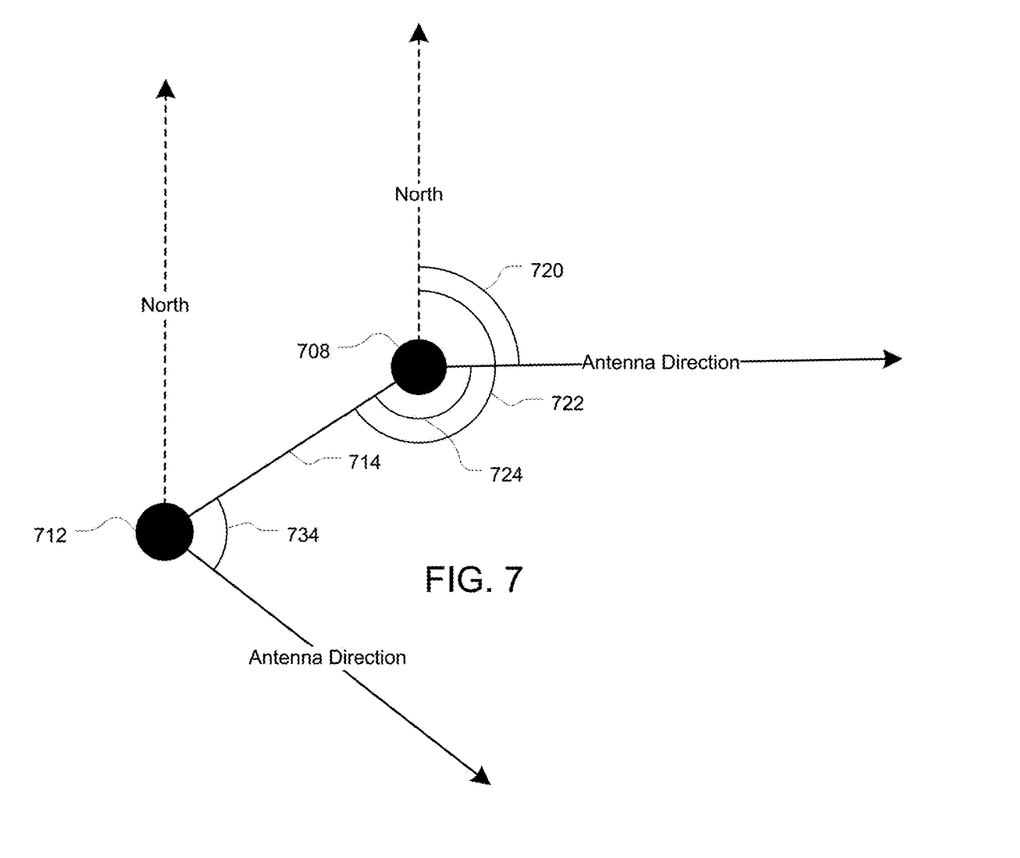
FIG. 7 shows source and neighbor relationships useful for detecting the presence of a crossed antenna feed.

A line between the source antenna and a target antenna is established at S504. FIG. 7 shows a source base station site 708 and a target base station site 712, as well as a line 714 that connects the source antenna to the target antenna. Here, a location of a base station may be used as a location of an antenna. The location may be expressed as latitude and longitude coordinates.

A first angle 720 ($\beta_s$) between the source antenna pointing direction and a reference direction is determined at S506. In the example of FIG. 7, the reference direction is north. However, in other embodiments, a different reference direction may be used, which may be a non-cardinal direction. A second angle 722 ($\alpha_s$) between the reference direction and the line 714 between the source and target antennas is determined at S508.

A first difference 724 between these angles is calculated at S510 by subtracting one angle from the other. In addition, the first difference may be subtracted from 360 degrees (or the angle corresponding to one complete rotation of a circle or circumference of circle divided by radius of circle) to determine a second difference. These differences may be compared to a predetermined threshold value at S512, and if either of the first and second differences are more than the threshold value, then the target antenna is determined to be in the pointing direction of the source antenna.

In an embodiment, the threshold value is 90 degrees. When the threshold value is 90 degrees, the pointing direction is defined by a plane normal to the antenna pointing direction, as shown in FIG. 6. In other embodiments, other threshold values may be used, such as 100 degrees and 75 degrees.

In an embodiment, this may be done on the basis of the relative orientation of the source cell antenna pointing direction with respect to the neighbor cell locations. The relative orientation is captured by the metric "Src2Nbr" defined as the angle between the source cell azimuth and the line joining the source cell to the neighbor cell location. This metric is calculated by process 500 according to the following Equation 1:

$$\text{Src2Nbr} = \min(|\alpha_s - \beta_s|, |360 - |\alpha_s - \beta_s||) \qquad [\text{Equation 1}]$$

Here, $\alpha_s, 0 \le \alpha_s \le 360$ is the antenna azimuth in degrees with reference to north, and $\beta_s, 0 \le \beta_s \le 360$ is the angle in degrees made by the line joining the source cell 708 to the neighbor cell 712 with reference to north. In an embodiment, the variable "Src2Nbr" represents the angle that is compared to the threshold value to determine whether a neighbor cell is within the pointing direction of a source antenna. When a neighbor is in the pointing direction of a source antenna, it may be within a zone of plus or minus a predetermined number of degrees from the antenna's azimuth.

A Src2Nbr metric may be determined for every target cell in the set of neighbor cells for a given source cell. In other words, process 500 may be performed for every neighbor cell in the set of neighbor cells determined at S304. Returning to process 300, a percentage of the set of neighbors that is found to be in the pointing direction of the source antenna may then be calculated at S312.

A determination on whether the source antenna points towards its neighbors may be made by comparing the percentage of neighbors that are within the pointing direction of the source antenna to a predetermined value. For example, when 50% or more of the neighbors are within the pointing direction of the source antenna as determined by process 500, then S310 may determine that the source antenna points towards its neighbors. Embodiments are not limited to the 50% value. In other embodiments, percentages such as 40% and 60% may be used.

When a source antenna points towards its neighbors, then it is not considered to be a candidate for a crossed antenna feed. On the other hand, the percentage of neighbor cells being less than the predetermined value suggests that the neighbor cells are primarily behind the source antenna, so the source antenna is designated as a candidate for having a crossed antenna feed.

Figure 8:
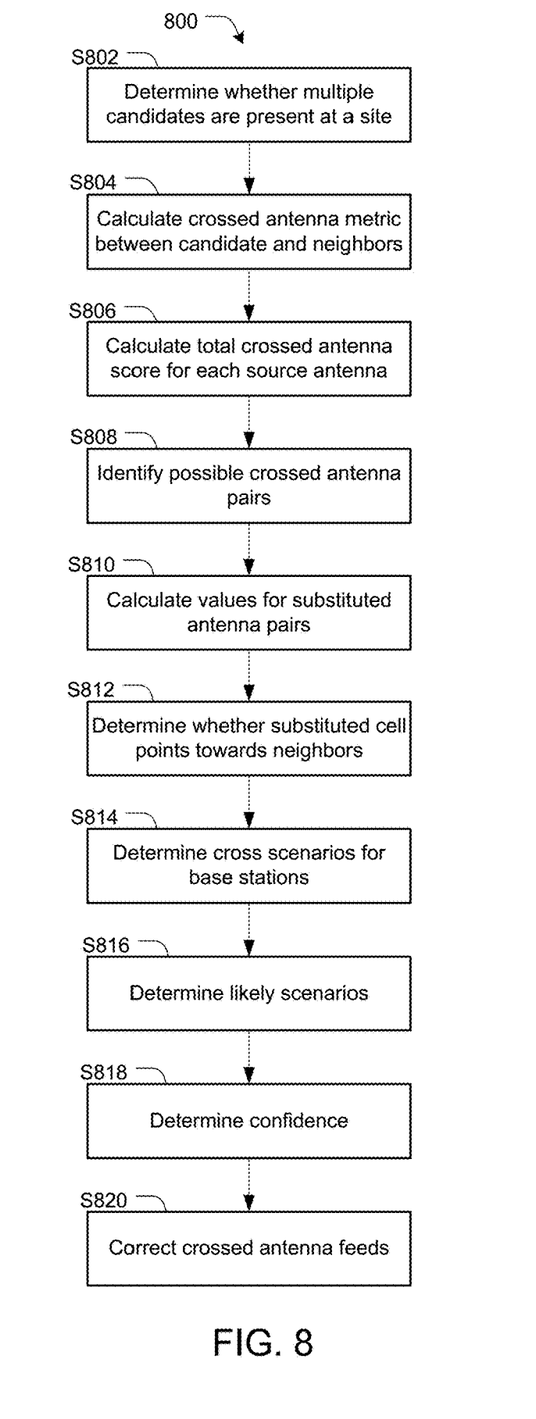
FIG. 8 illustrates an embodiment of a process for detecting the presence of a crossed antenna feed.

FIG. 8 shows an embodiment of a process 800 of evaluating the crossed antenna feeder candidates identified in process 300. Process 800 may detect the presence of crossed antenna feeds. Each candidate antenna identified by process 300 may be separately analyzed by process 800.

The presence of multiple candidate antennas at a particular base station site is determined at S802. In an embodiment, S802 is performed for each combination of technology and frequency for the base station. For example, if a base station serves one set of frequencies for 2G cellular technology and two separate frequency bands of LTE technology, then each of the three frequency/technology combinations would be separately evaluated. In another embodiment, S802 is only performed for each technology at the base station.

Embodiments of the present disclosure determine whether multiple crossed antenna feed candidates are present within each frequency/technology combination for cell-site at S802. In an embodiment, when only one candidate cell is found for a given frequency/technology combination, then the candidate is not investigated further. However, some embodiments may not perform S802, and analyze all antennas of a cell-site instead.

A crossed antenna metric, or score, is calculated for a cell of the source antenna at S804. The crossed antenna metric may take into account the relative geographic orientations of the source and neighbor cell and handovers between the source and a neighbor cell.

In an embodiment, the crossed antenna metric for a source cell and a given neighbor cell considers the orientations of the antennas associated with the cells, as well as a level of handover activity between the cells. In particular, the score may consider a level of successful handovers from the neighbor cell to the source cell.

In one specific embodiment, the metric is defined according to the following Equation 2:

$$XAntennaScore = (\cos(Src2Nbr) + \cos(Nbr2Src)) * \log_{10}\left(\frac{IntraHOSucc * 100}{TtlHOSucc * MinHO}\right) * \frac{2}{\log_{10}\left(\frac{100}{MinHO}\right)} \quad \text{[Equation 2]}$$

In Equation 2, the variable Src2Nbr refers to an angle between a line connecting the source antenna to the neighbor antenna and an azimuth of the source cell. Such an angle is shown in FIG. 7 as angle 724 between the antenna direction of source antenna 708 and line 714 connecting the source antenna to neighbor antenna 712. With respect to FIG. 7, the variable Nbr2Src refers to angle 734 between the azimuth of neighbor cell antenna 712 and line 714 between source antenna 708 and the neighbor antenna.

In Equation 2, IntraHOSucc refers to the number of successful intra-frequency handovers from the source cell to the neighbor cell within a given time period. TtlHOSucc is the total number of successful intra-frequency handovers from the source cell to all neighbor cells within the given time period. MinHOActivity is a threshold value. For example, in an embodiment, a neighbor will only be evaluated if the number of successful intra-frequency handovers from the source cell to the neighbor cells is at least 1% of handover successes from the source cell to all of its neighbors. In an embodiment, MinHO is the same variable used to determine relevant neighbors at S308. The given time period may be, for example, one day or one week.

A second crossed antenna score, or total crossed antenna score, for the source cell is calculated at S806. The crossed antenna score for the source cell may be performed by summing each of the crossed antenna metrics for each neighbor antenna of the source antenna determined at S804. In an embodiment, S806 is performed for every frequency and technology combination that is served by the source antenna. In another embodiment, scores are only calculated for the cells that were identified as candidate cells by process 300.

In another embodiment, an average score may be used instead of summed score. In still another embodiment, the average score is normalized according to an amount of activity associated with the cell.

Crossed antenna candidate pairs are identified at S808. A crossed antenna pair is a scenario in which an antenna feed for a first cell is reversed with to the antenna of a second cell.

In an embodiment, all combinations of crossed antenna feeds are identified at S808. For example, at a site with two cells A and B, two directional pairs, A>B and B>A are possible. When a base station serves three cells A, B and C, six crossed antenna candidate pairs are possible for the cells: A>B, A>C, B>A, B>C, C>A and C>B ($_3C_2*2$). In these pairs, the first cell may be referred to as the source cell, and the second cell may be referred to as the destination cell. For example, when the feed for cell A is attached to cell B, cell A is the source cell and cell B is the destination cell.

In another embodiment, crossed antenna pairs are only identified for antennas that were identified as crossed antenna candidates by process 300.

At S810, the antenna azimuth of the source cell is substituted for the azimuth of the destination cell for each possible directional pair identified at S808, and a new crossed antenna score is calculated based on this determination. Calculating the new crossed antenna score may be accomplished in the same manner as the crossed antenna score calculated at S806, including calculating values for each source/neighbor pair and calculating a final score based on all source/neighbor pair values. Thus, S810 may include performing process 500 using the antenna azimuth of the source cell and the neighbor set of the destination cell.

In addition, a percentage of neighbors for the source cell that are within the pointing direction of the antenna of a destination cell is determined at S812 for each destination cell. Determining the percentage of neighbors that are within the pointing directions of the antennas may be accomplished in the same manner discussed above, including determining a Src2Nbr value according to equation 1.

In an embodiment, a direction pair may be added to a list of possible directional crossed pairs at the site if the percentage of neighbor cells of the source cell in the antenna direction of the destination cell of the directional pair is greater than a threshold value, and the new antenna score metric calculated for the source cell based on the antenna direction of the destination cell of the directional pair is greater than its original antenna score metric. The equations described by this disclosure are designed to facilitate such a comparison, and other embodiments may use other specific criterial for identifying a direction crossed pair. An example of the threshold for comparing the percentage of neighbors in the antenna direction metric is 50%.

Once all the possible directional pairs of candidate cells at a site are evaluated, the possible cross scenarios at a site that can be formed from these directional pairs are analyzed. To this end, a list of possible cross scenarios that can be formed from the number of candidate cells at a site may be created at S814. The number of cross-scenarios when there are up to 4 suspect-cells at a site are as follows.

For two candidate cells (A and B), one cross scenario is possible, where the antenna feeders are reversed between cells A and B. In this scenario, two directional pairs (A>B and B>A) are involved.

For three candidate cells (A, B and C), three ($_3C_2$) pair crosses (A & B, B & C and C & A) and two 3-cell cross scenarios (Scenario 1: A crossed with B, B crossed with C, C crossed with A, Scenario 2: A crossed with C, B crossed with A and C crossed with B) are possible. In Scenario 1, the directional pairs A>B, B>C and C>A are involved. Similarly, in scenario 2, the directional pairs A>C, B>A and C>B are involved.

For four candidate cells (A, B, C and D), 12 ($_4C_2$) crossed pairs, 8 ($_3C_2$) 3-cell and 6 (3!) 4-cell crosses are possible. A cross scenario may be added to the list of possible-cross-scenarios if all the directional pairs that form the cross scenario are included in the list of possible-directional-cross-pairs.

Although specific embodiments are described in detail by this disclosure, embodiments are not limited by the description. Multiple alternatives are possible. For example, another embodiment may simply test every possible combination of crossed antennas in a network.

Likely crossed antenna feed scenarios are then determined at S816. In an embodiment, a measure of the collective improvement of crossed antennas for directional pairs involved in a crossed antenna feed scenario is calculated for each tested scenario. For example, the improvement in the crossed antenna feed scores for a given scenario may be calculated according to the following Equation 4:

$$XAntScrImprovement = \frac{\sum x \in X(SwappedCumScr(x) - CumScr(x))}{N} \qquad \text{[Equation 4]}$$

In Equation 4, N is the number of directional pairs in the cross scenario and X is a set of the source cells of the directional pairs in the cross scenario. In an embodiment, the scenario with the largest improvement is selected as the most likely scenario at S816.

In the case of a site with 4 or more candidate cells, if a cross scenario is identified as the most likely crossed antenna scenario, the remaining cells could be included in other potential crossed antenna scenarios. If the scenarios formed by the remaining cells are part of a list of possible-cross-scenarios, they may also be included as likely crossed antenna scenarios for the site.

When a potential crossed antenna scenario is identified, the confidence in the identified scenario may be calculated at S818. In an embodiment, this may be done on the basis of the XAntScrImprovement metric of Equation 4. In other words, the confidence value may be the degree to which the neighbor and handover based metrics are improved by substituting a first cell.

In another embodiment, the confidence may be determined at S818 on the basis of a minimum improvement metric based on the minimum improvement among the directional pairs after crossing antennas. In an embodiment, the confidence in the identified scenario using the minimum improvement can be determined as low when the minimum improvement is less than 0.5, medium when the improvement is between 0.5 and 2.0, and high if the minimum score is above 2. However, all of these specific values are only provided to illustrate an embodiment, and many variations of the confidence scaling are possible.

In an embodiment, a percentage of neighbor cells that are in the pointing direction of the source cell is also used to determine confidence. Confidence increases as the percentage of neighbor cells in the pointing direction of the source cell increases. Therefore, the confidence determined at S818 may be scaled according to the percentage of neighbors in the pointing direction of the source antenna, in addition to or instead of the improvement score, etc.

Although embodiments above are explained as being applied to candidate cells, other embodiments may evaluate more situations. In various embodiments, all cells of a cell site may be tested using process 800. In another embodiment, only cells which are identified as crossed antenna feed candidates by process 300 are tested. In another embodiment, when one cell of a base station is identified as a candidate, all possible antenna feed cross scenarios are tested in process 800.

A most likely scenario, or a plurality of likely scenarios, may then be provided to a technician, who could be dispatched to the cell site to correct the crossed antenna feed at S820. In another embodiment, when multiple scenarios of combinations of candidate cells are present at a cell site, the cell site and information regarding the cell site are provided to a technician that can confirm and resolve crossed antenna feeds for a site.

In an embodiment, the consistency of parameters may be checked to ensure that data is accurate. An embodiment may use antenna azimuth, latitude and longitude information of a site to ensure that this information is within expected numeric limits and is consistent.

In an embodiment, an ANR module may be run for cells of the network to ensure that neighbor cell information is current and accurate before determining sets of neighbors at S306.

In an embodiment for UMTS networks, detected set reporting (DSR) information may be utilized to augment the performance of the algorithm. Detect set reporting by the UEs of a source cell provides signal strength measurements from cells which are not necessarily neighbors. This provides information on the coverage region of a cell, even if the UMTS neighbor lists have missing neighbors. Thus, DSR information could be used verify that the coverage region of a cell is in the direction of its antenna pointing direction and potentially identify crossed antenna feeders.

LTE networks provide metrics to guide MIMO transmission modes. These include channel rank indicators and most suitable transmission modes for the channel between the UE and the base station. In an embodiment for LTE networks, these metrics could be utilized within the crossed-feeder antenna algorithm to enhance the identification of sites with crossed-feeder issues.

Embodiments of this disclosure identify sites at which antenna feeders may potentially be crossed between cells belonging to different sectors. In some implementations, data from drive tests, measurements at the sites or UE measurements used in conjunction with a Geo-location tool may optionally be used to confirm the existence of crossed antennas at the site.

When a crossed antenna feed is identified, it can be fixed by crossing-back the antenna feeders at the site or by updating the configuration information of the cells such that it is consistent with the actual physical configuration at the site.

Identifying and resolving a crossed feeder antenna can improve the effectiveness of network performance management operations including coverage and capacity optimization, cell outage compensation, load balancing, and ANR operations.

What is claimed is:

1. A method for a cellular telecommunications network, the method comprising:
    selecting first and second source cells that are co-sited cells associated with first and second antennas, respectively;
    identifying first neighbor cells of the first cell from a first neighbor cell list that is retained by a base station serving the first cell and transmitted to UEs within the first cell;
    identifying second neighbor cells of the second cell from a second neighbor cell list that is retained by a base station serving the second cell and transmitted to UEs within the second cell; and
    determining that an antenna feed for the second cell is feeding the first antenna by comparing locations of the first neighbor cells to a pointing direction of the first antenna,
    wherein comparing locations of the first neighbor cells to a pointing direction of the first antenna includes determining whether a predetermined portion of neighbor cells of a neighbor cell list of the first cell are behind the first antenna, and
    wherein the predetermined portion is at least 40%.

2. The method of claim 1, further comprising:
    disconnecting the antenna feed for the second antenna from the first antenna; and
    connecting the antenna feed for the second antenna to the second antenna.

3. The method of claim 1, wherein the pointing direction defines a zone based on an azimuth value of the first antenna stored by the network, and comparing locations of the first neighbor cells to the pointing direction of the first antenna includes determining a portion of the first neighbor cells that are in the zone.

4. The method of claim 3, wherein the zone is bounded by a predetermined angle from the azimuth value of the first antenna.

5. The method of claim 1, further comprising:
    calculating a first crossed antenna feed score for the first cell based on the locations of the first neighbor cells, wherein the first crossed antenna feed score is used to determine that the antenna feed for the second cell is feeding the first antenna.

6. The method of claim 5, wherein calculating the first crossed antenna feed score for the first cell includes determining handover data for handovers from the first cell to the first neighbor cells.

7. The method of claim 5, wherein the first neighbor cells are cells on a neighbor cell list (NCL) of the first cell, and wherein the first crossed antenna feed score is calculated by analyzing relationships between the first cell and each of the first neighbor cells.

8. The method of claim 5, further comprising:
    calculating a second crossed antenna feed score for the second cell by analyzing relationships between the second cell and each of the first neighbor cells.

9. The method of claim 8, further comprising:
    comparing the first crossed antenna feed score to the second crossed antenna feed score to determine that the antenna feed for the second cell is feeding the first antenna.

10. The method of claim 1, wherein determining that the antenna feed for the second cell is feeding the first antenna includes determining that a majority of the first neighbor cells that receive handovers from the first cell are not within the pointing direction of the first antenna.

11. A network resource controller in a wireless telecommunications network, the controller comprising:
    a memory;
    a processor; and
    a computer readable medium with executable instructions stored thereon which, when executed by the processor, perform the following operations:
    selecting first and second source cells that are co-sited cells associated with first and second antennas, respectively;
    identifying first neighbor cells of the first cell from a first neighbor cell list that is retained by a base station serving the first cell and transmitted to UEs within the first cell;
    identifying second neighbor cells of the second cell from a second neighbor cell list that is retained by the base station serving the first cell and transmitted to UEs within the second cell; and
    determining that an antenna feed for the second cell is feeding the first antenna by comparing locations of the first neighbor cells to a pointing direction of the first antenna,
    wherein comparing locations of the first neighbor cells to a pointing direction of the first antenna includes determining whether a predetermined portion of neighbor cells of a neighbor cell list of the first cell are behind the first antenna, and
    wherein the predetermined portion is at least 40%.

12. The network resource controller of claim 11, wherein the pointing direction defines a zone based on an azimuth value of the first antenna stored by the network, and comparing locations of the first neighbor cells to the pointing direction of the first antenna includes determining a portion of the first neighbor cells that are in the zone.

13. The network resource controller of claim 12, wherein the zone is bounded by a predetermined angle from the azimuth value of the first antenna.

14. The network resource controller of claim 11, wherein the operations further comprise:
   calculating a first crossed antenna feed score for the first cell based on the locations of the first neighbor cells,
   wherein the first crossed antenna feed score is used to determine that the antenna feed for the second cell is feeding the first antenna.

15. The network resource controller of claim 11, wherein calculating the first crossed antenna feed score for the first cell includes determining handover data for handovers from the first cell to the first neighbor cells.

16. The network resource controller of claim 11, wherein the first neighbor cells are cells on a neighbor cell list (NCL) of the first cell, and
   wherein the first crossed antenna feed score is calculated by analyzing relationships between the first cell and each of the first neighbor cells.

17. The network resource controller of claim 11, wherein the operations further comprise:
   calculating a second crossed antenna feed score for the second cell by analyzing relationships between the second cell and each of the first neighbor cells.

18. The network resource controller of claim 11, wherein the operations further comprise:
   comparing the first crossed antenna feed score to the second crossed antenna feed score to determine that the antenna feed for the second cell is feeding the first antenna.

19. The network resource controller of claim 18, wherein determining that the antenna feed for the second cell is feeding the first antenna includes determining that a majority of the first neighbor cells that receive handovers from the first cell are not within the pointing direction of the first antenna.

* * * * *